United States Patent [19]

Victor

[11] 4,388,817
[45] Jun. 21, 1983

[54] VEHICLE WHEEL AND METHOD OF MANUFACTURING SAME

[75] Inventor: Rene R. Victor, Nogent-sur-Marne, France

[73] Assignee: Etablissements Letang & Remy, Paris, France

[21] Appl. No.: 204,376

[22] Filed: Nov. 5, 1980

[30] Foreign Application Priority Data

Nov. 30, 1979 [FR] France ................................ 79 29540

[51] Int. Cl.³ ............................................. B21H 1/04
[52] U.S. Cl. .......................................... 72/68; 72/71; 29/159.01
[58] Field of Search .............................. 72/68, 70, 71; 29/159 R, 159.1, 159.01

[56] References Cited

U.S. PATENT DOCUMENTS

| 1,555,771 | 9/1925 | Stenz | 29/159 R |
| 2,075,294 | 3/1937 | LeJeune | 29/159.01 |
| 2,279,816 | 4/1942 | Eppler | 29/159 R |
| 3,822,458 | 7/1974 | Schulte et al. | 29/159.01 |

*Primary Examiner*—Lowell A. Larson
*Attorney, Agent, or Firm*—Becker & Becker, Inc.

[57] ABSTRACT

Method for manufacturing a vehicle wheel from a light alloy sheet in which the edge of the sheet is split in the radial direction for making two rings which are shaped to obtain a runway for the wheel.

3 Claims, 5 Drawing Figures

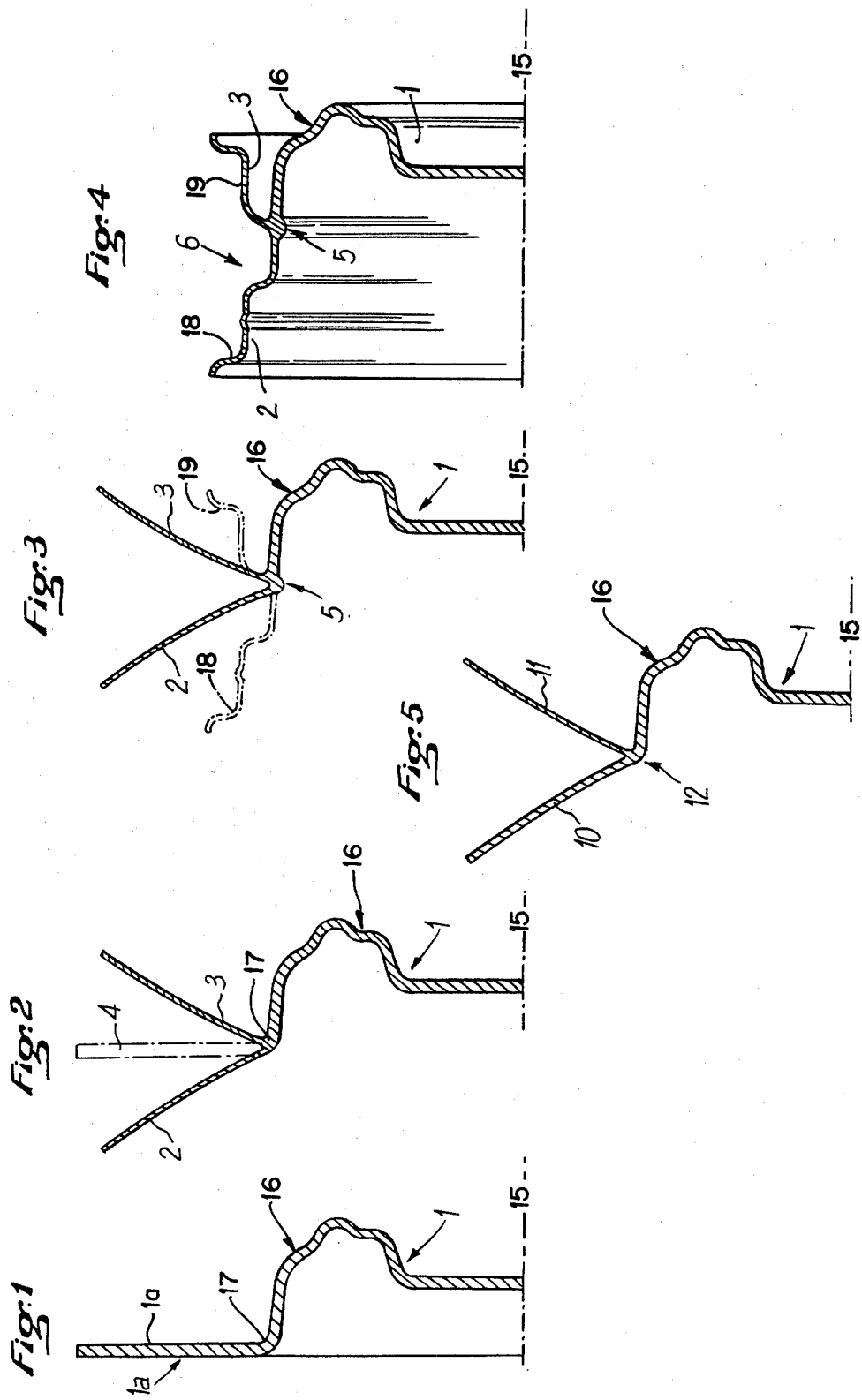

VEHICLE WHEEL AND METHOD OF MANUFACTURING SAME

Vehicle wheels up to now have been manufactured either from shaped steel sheets or from molded light alloys. However, these two manufacturing methods, even if they have given rather good results, produce vehicle wheels which are heavy. Therefore, when the vehicle is driven at a high speed, the inertia of the wheels is important and they consume a lot of power.

In an attempt to remedy these important drawbacks, an object of the present invention is to set forth a method for manufacturing vehicle wheels from a metal sheet principally of light metal, which first is shaped, then partially split in its thickness and the two elements thereby obtained are then shaped so to obtain, on the one hand, the central part of the rim and, on the other hand, the peripheral part or runway of the wheel on which a pneumatic tire assembly is mounted.

According to the invention, the method for manufacturing vehicle wheels comprises the steps of cutting a given surface area of a sheet of a metal containing alloy; conforming a preliminary shape from the given surface area, said preliminary shape having a peripheral portion; splitting the peripheral portion in a radial direction for forming thereby two rings of a given thickness separated by a radial groove having a lower zone; conforming the two rings for obtaining thereby a flattened peripheral portion forming a runway for the wheel and on which a pneumatic assembly will be mounted.

According to another feature of the invention, the lower zone of the groove is submitted to crushing and thus forming a peripheral pad delimiting the central part of the rim and reinforcing thereby the lower zone of the groove.

According to another feature of the invention, the radial groove is made by forming a first ring of a thickness double that of the second ring, the lower zone of the groove being still provided to form both a stop for the radial groove and a reinforcement for the periphery of the central area of the rim.

Various other features of the invention are moreover revealed from the following detailed description.

This object, and other objects and advantages of the present invention, will appear more clearly from the following specification in connection with the accompanying drawing, in which:

FIG. 1 is a cross sectioned half showing a fragmentary elevational view of a preliminary shape of a rim, FIG. 2 is a view corresponding to FIG. 1 showing the radial split provided for forming the two peripheral rings of the rim, FIG. 3 shows the peripheral rings being formed as well as the reinforcing pad, FIG. 4 is an illustration of a half in a fragmentary elevational view partly in cross-section of a rim made according to the method of the invention, and FIG. 5 is an illustration of a half in a fragmentary elevational cross-section of a rim made according to the method of the invention but in which the peripheral rings are of different thickness.

FIG. 1 shows a preliminary hub or rim 1 for an automobile vehicle which hub has an axis 15 which is coextensive with the axle (not shown) of the wheel. By suitably cutting a given surface area of steel or light alloy sheet material, for example an aluminum alloy sheet, then, by a stamping or similar process, there is made the preliminary shape of a blank which a half cross-section is shown in FIG. 1. The blank has a sub-rim portion 16 which is attached to the axle (not shown) of the vehicle with the axis 15 aligned with the axle. An upper part or second section 1A of the blank extends from a juncture 13 with the sub-rim portion 16. The upper part or second section 1a of the preliminary shape is then suitably split with a tool 4 (FIG. 2) for forming a radial groove and obtaining two rings or first and second circular flanges 2, 3 respectively each having the same in this case.

As shown in FIG. 3, making the radial groove is terminated when the lower end of the groove is forced back by creating a pad speed 5 stopping the groove and reinforcing the outer peripheral edge of the central part of the rim 1. The rings or circular flanges 2, 3 are then deformed while maintaining the thickness thereof by means of one or several sets of rollers (not shown) suitably placed for making the runway 6 of the rim hub with first and second rim portions 18 and 19 respectively (FIG. 4), which enables mounting of a pneumatic tire assembly which expediently can be a tube assembly or a tube-less assembly. In the periphery of the rim there exists a radial hole (not shown) for passing the tire valve therethrough.

In the example of FIGS. 1–4, the rings 2, 3 forming the runway 6 are of a substantially equal thickness. It is however possible, as shown in FIG. 5 to via the same splitting method to make two rings 10, 11 of a different thickness. In the present case, the ring 10 has a thickness double that of ring 11. As in the previous embodiment, a pad (not shown) is provided in the area 12 for reinforcing the peripheral edge of the central part of the rim and enabling also to suitably stop the separating radial groove giving the two rings 10, 11 and which otherwise could create a beginning of breakage at this point. The rings 10, 11 are then made as shown hereinabove.

The pad 5 is preferably made by a crushing process or a working in repulse but it could also be made in any other way as for example by a welded seam.

With previous methods for manufacturing vehicle wheels, it was necessary to check each wheel individually to be sure that no flaws or breaks exist, when a molding process was used. Actually, flaws and breaks are a risk always possible or latent in such manufacturing methods. For wheels made from a stamped steel sheet it was also necessary to check each wheel individually in order to be sure of perfect balance thereof since, here again, there frequently occurs a lack of balance which is highly prejudicial to the wheel as well as to production of the pneumatic tire assembly and to the whole vehicle itself.

The method as hereinabove described which makes use of a partial radial splitting of a rolled metal or alloy sheet obviates all the risks mentioned in the above disclosure and has the advantage of not necessitating any soldering for connecting the runway 6 to the central part of the rim. This wheel is therefore perfectly in agreement with safety regulations and can be mounted without any problem on the hub of a vehicle wheel.

The present invention is of course in no way restricted to the specific claims.

I claim:

1. A method of manufacturing a vehicle hub of light weight alloy for rotation about an axis, comprising in combination the steps of:
    forming a sheet of the alloy into a blank having a first portion for attachment to an axle aligned with the axis about which the hub rotates, the first portion having a sub-rim portion extending generally in the same direction as the axis of the hub, the blank further having a second portion extending radially from a juncture with the sub-rim portion;

splitting the second portion from the periphery thereof to the juncture with the sub-rim portion to form first and second circular flanges extending from the juncture with the sub-rim while thickening the juncture to form a reinforcing bead while maintaining the thickness of the first circular flange, bending the first flange away from the sub-rim and also bending the first flange into a first rim portion for supporting one wall of an inflatable tire, and while maintaining the thickness of the second circular flange, bending the second flange over the sub-hub and also bending the second flange into a second rim portion for supporting the other wall of the inflatable tire.

2. The method of claim 1 wherein the splitting step is performed closer to one surface of the second section than the other, wherein the second circular flange has a thickness greater than the first circular flange.

3. The method of claim 1 or claim 2 wherein the thickening of the juncture is accomplished by crushing material toward the juncture while splitting the second portion.

* * * * *